United States Patent [19]

Fuller

[11] 3,743,806
[45] July 3, 1973

[54] RELEASABLE CARTRIDGE MOUNTED SERVOMECHANISM FOR AN OPERATING UNIT LATCHED TO A KEEPER DEVICE ON THE CARTRIDGE THEREOF

[75] Inventor: Maurice D. Fuller, Mercer Island, Wash.

[73] Assignee: Korry Manufacturing Company, Seattle, Wash.

[22] Filed: May 8, 1972

[21] Appl. No.: 251,221

[52] U.S. Cl. ..... 200/167 A, 200/169 C, 200/169 PB
[51] Int. Cl. ............................................. H01h 9/20
[58] Field of Search .................... 200/167 A, 167 R, 200/168 R, 168 K, 169 PB, 159 R, 169 C

[56] References Cited
UNITED STATES PATENTS 3,267,245   8/1966   Vincent .......................... 200/167 A
2,935,653   5/1960   Campe et al.................... 200/167 A
2,924,692   2/1960   Campe et al.................... 200/167 A

*Primary Examiner*—Robert K. Schaefer
*Assistant Examiner*—William J. Smith
*Attorney*—Christensen & Sanborn

[57] ABSTRACT

The servomechanism and the keeper device are especially designed to withstand high impact forces. In particular, the servomechanism has a pair of telescopically assembled caged springs which vary the bias on the mechanism in the respective reciprocable directions thereof; whereas the keeper device has a catch plate therein which must be displaced to one side, against a bias, to latch and unlatch the operating unit with respect thereto.

10 Claims, 5 Drawing Figures

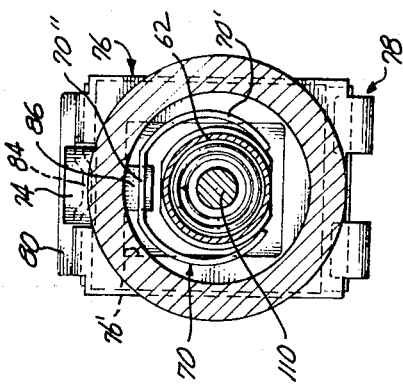
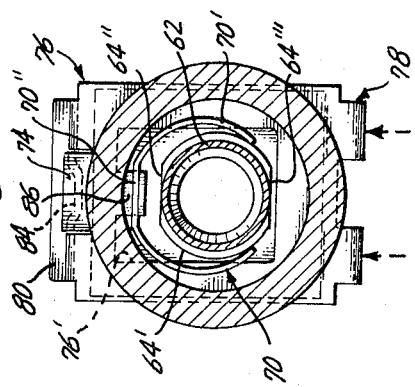
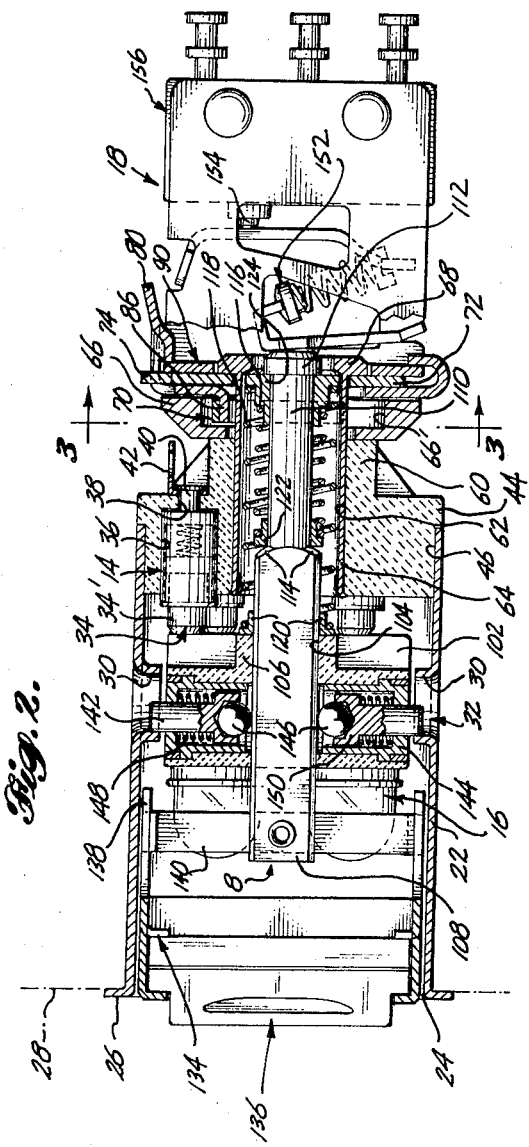
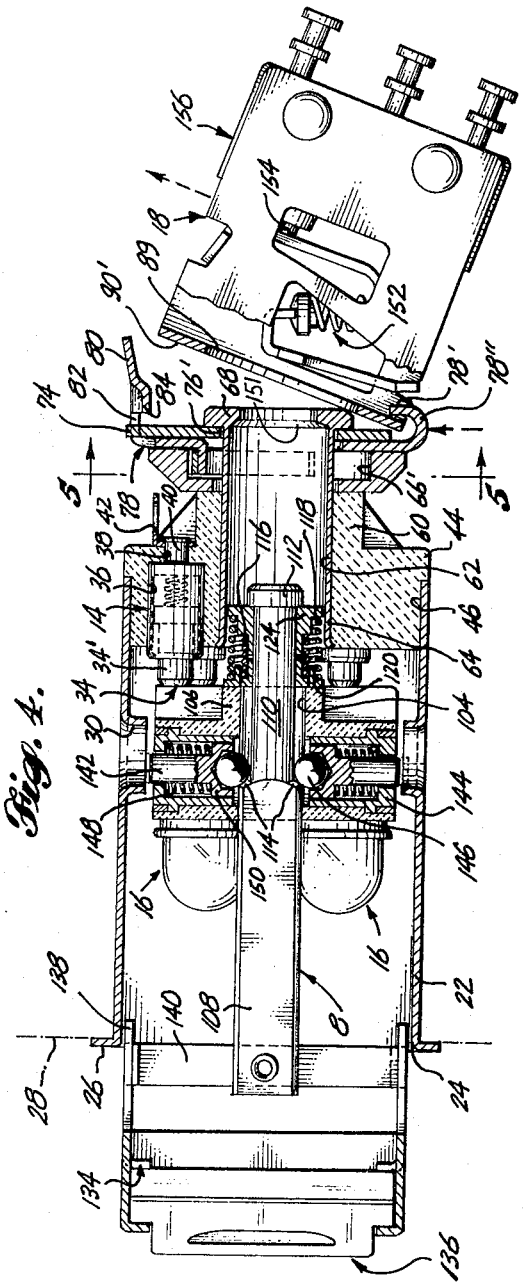

RELEASABLE CARTRIDGE MOUNTED SERVOMECHANISM FOR AN OPERATING UNIT LATCHED TO A KEEPER DEVICE ON THE CARTRIDGE THEREOF

FIELD OF THE INVENTION

This invention relates to cartridge mounted servomechanisms, and in particular to plunger style servomechanisms which are releasable from the cartridge and adapted to actuate an electrical operating unit which is latched to a keeper device on the cartridge.

BACKGROUND OF THE INVENTION INCLUDING CERTAIN OBJECTS THEREOF

Panel mounted electrical cartridges are in wide use today, and in particular those which incorporate a servomechanism and a latch-mounted operating unit of the aforementioned nature. Yet the various modes of use for these assemblies subject them to occasional shock forces, and in the past they have sometimes failed to retain the servomechanism and/or the operating unit when subjected to such forces, and particularly when subjected to shock forces of a magnitude comparable to the 2,000 foot-pound standard military test.

One object of the present invention therefore, is to provide a cartridge assembly of this nature in which both the servomechansim and the operating unit will remain intact on the cartridge under such test conditions. Another object is to provide a cartridge assembly of this nature wherein the shock forces are converted to compressed potential energy in a component or components of the assembly, for purposes of restoring the servomechanism and/or the operating unit to its locked or latched condition, before the mechanism or the unit escapes from the assembly. A further object is to provide an assembly of this nature wherein the bias of the compressed component or components varies from that necessary to operate the servomechanism. Still another object is to provide an assembly of this nature wherein the operating unit and the cartridge are disengageable from one another, only by the application of dual forces applied in relatively dihedral planes of the order of 90° to one another. Other objects include the provision of an assembly of this nature wherein the operating unit is latched to a keeper device on the cartridge, by means of a latch member on the unit, having a pair of spaced oppositely disposed lugs in a terminal face thereof, and a stop recessed relatively inwardly of the member from said face in the space between the lugs. Still further objects will become apparent from the description of the invention which follows hereafter.

SUMMARY OF THE INVENTION

These and other objects and advantages are realized in part by a keeper device of my invention which is adapted to engage a latch member of the foregoing nature, and which comprises core means that define a relatively stationary abutment on a terminal face of the device, which projects relatively outwardly of the device from the face, and is accompanied by peripheral means thereadjacent which are reciprocable on a parallel to the plane of the face, but yieldably biased into a normally stopped position spaced about the abutment. The peripheral means define a pair of recesses which are spaced apart from one another across the abutment, and open relatively toward one another in the directions of reciprocation, and which are spaced apart from the abutment so that the lugs of the latch member interengage with the recesses in the normally stopped position of the peripheral means, when one lug of the member is inserted in one recess of the device, and the member is rotated in the sense that the stop is slidably engaged with the abutment, and the other lug is slidably engaged with the peripheral means, at a point adjacent the other recess, so as to reciprocate the peripheral means in the direction opposed to the bias thereon.

For example, the peripheral means may include an apertured catch plate which has opposing recesses in flanges on opposite ends thereof, and which is slidably guided about a core member having a pair of oppositely disposed part cylindrical surfaces thereon; and a U-shaped spring clip whose legs are engaged about the surfaces, and which is connected to the catch plate, so that the catch plate displaces the clip in relation to the core member, in the sense of causing the legs of the clip to separate against the bias thereof, when the latch member is interengaged with the recesses of the catch plate in the manner described above.

In present day applications of the invention, the keeper device is mounted on an open-ended cartridge, and both the latch member and the keeper device have apertures therein, which register with one another when the latch member is engaged on the device, so that a plunger style servomechanism that is housed in the cartridge, can be reciprocated through the apertures in the member and the device, to actuate an operating unit that is disposed on the latch member. Moreover, the servomechanism is preferably one which is releasable from the cartridge, for example, by virtue of the plunger being reciprocably guided in a collar which is carried thereon, and which is equipped with a lock mechanism that is responsive to relative reciprocation of the plunger, to lock and unlock the collar with respect to the cartridge, when the collar assumes a predetermined position in the cartridge.

The foregoing objects and advantages are also realized by a cartridge mounted servomechanism of my invention that includes a reciprocably guided plunger which is operable to actuate the operating unit in one reciprocable direction thereof, and releasable from the cartridge in the other reciprocable direction thereof. The plunger has relatively larger diameter and smaller diameter portions thereon, joined by a step therebetween, and pairs of collars slidably engaged thereon, one pair of which is slidably engaged on the relatively larger and smaller diameter portions, respectively, and the other pair of which is slidably engaged on the smaller diameter portion alone. In addition, there are means including the step, which are operable to limit the travel of the collars in the aforesaid reciprocable directions of the plunger, and a pair of yieldable biasing elements which are interposed between the respective pairs of collars and telescopically compressible and extendable, one within the other, to vary the bias on the plunger when it is reciprocated in the respective reciprocable directions thereof.

For example, to render the plunger releasable from the cartridge, yet operable within the servomechanism, the collar on the relatively larger diameter portion of the plunger may have a locking element thereon which is projectable and retractable in a transverse plane of the collar, and which is engageable with a locking detent on the cartridge in the projected condition thereof, there being means cooperable therewith to project and retract the locking element in response to reciprocation of the step between the opposite sides of the plane of the collar.

In present day applications of the invention, the relatively smaller diameter portion of the plunger is inserted in a bushing having an inturned flange on one end portion thereof, forming a stop for the collars thereadjacent, and the bushing forms the core member of the keeper device, not only in the sense that the flanged end portion of the same also forms the abutment of the device, but also in that the bushing has a washer-like outturned flange thereon with which the catch plate is slidably engaged to be guided in the reciprocable motion thereof.

BRIEF DESCRIPTION OF THE DRAWINGS

These features will be better understood by reference to the accompanying drawings which illustrate one of these embodiments in the context of an illuminated, push-button actuated a sembly which is operable in turn to actuate a switch unit latched to a keeper device on the distal end of the cartridge.

In the drawings,

FIG. 2 is a part longitudinal cross-sectional view of the assembly when the switch unit is latched to the device, and the collar of the servomechanism is locked within the cartridge;

FIG. 3 is a cross-sectional view along the lines 3—3 of FIG. 2, illustrating the keeper device in the latched condition of the switch unit;

FIG. 4 is another part longitudinal cross-sectional view of the assembly when the switch unit is unlatched from the device, and the collar of the servomechanism is unlocked from the cartridge for retraction of the servomechanism therefrom; and FIG. 5 is a cross-sectional view along the lines 5—5 of FIG. 4, illustrating the keeper device in the unlatched condition of the switch unit.

DESCRIPTION OF THE PREFERRED EMBODIMENT

Figure 1:
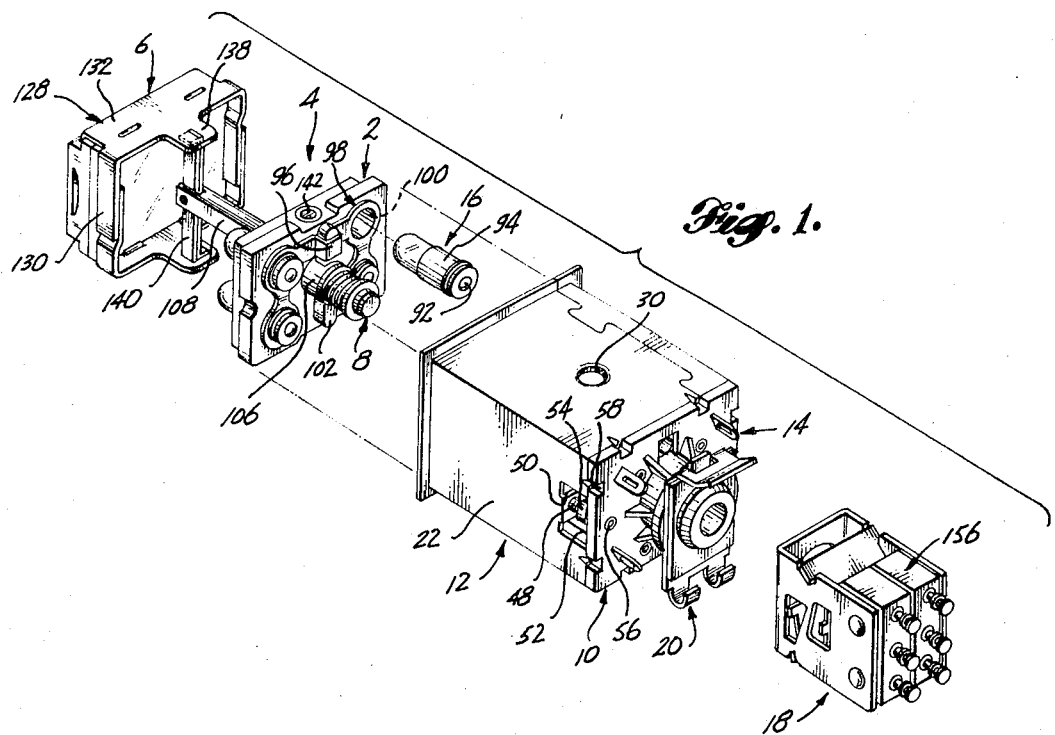
FIG. 1 is a perspective view of the various components in the assembly, including the switch unit.

Referring to the drawings, it will be seen that the collar 2 of the servomechanism 4 is also adapted to serve as a lamp base for the pushbutton cap 6 of the plunger 8 therein, and that the distal or rear end bulkhead 10 of the cartridge 12 is likewise adapted to serve as a mounting base for an electrical contact assembly 14 through which the lamps 16 are energized when the servomechanism is inserted in the cartridge to serve as an operating means for the switch unit 18 latched to the keeper device 20 thereon.

The main body of the cartridge 12 comprises an open-ended tubular metal sheath 22 which is rectangular in cross section and normally oriented so that the open end 24 thereof assumes the lower and wider profile of the same. The end opening 24 of the sheath is also normally oriented in the forward direction of the cartridge, and has an outturned flange 26 therearound which is adapted to abut the face of a panel 28 in which the cartridge may be mounted. To the rear of the flange, there is a pair of vertically aligned, inwardly dimpled holes 30 which are suitably located in the top and bottom panels of the sheath, so that the dimples of the same can serve as the detents for the lock mechanism 32 in the collar 2 of the servomechanism. The lock mechanism is actuated when the lamps abut the contact assembly, and the plunger thereafter undergoes reciprocation in relation to the collar.

The contact assembly 14 comprises a plurality of spring-loaded contact posts 34 which are oriented forwardly of the bulkhead and mounted in the counterbores 36 of an equal number of spaced, front counterbored holes 38 in the body of the bulkhead 10. Each of the posts 34 is retained in its respective bore 36 by inserting a cylindrical part hollow, reduced diameter pin 40 on the bottom of the post, into the respective hole 38, and then flaring the pin over against the outside face of the bulkhead, to anchor it thereto. At the same time, moreover, a slotted, right angular contact prong 42 is secured about the pin, for connection to an electrical lead (not shown) outside of the cartridge.

The bulkhead 10 is formed by a molded plastic block which is front rabbetted about the perimeter thereof, and slidably inserted in the rear end portion of the sheath until the shoulder 44 of the rabbet 46 abuts against the rear end edge of the sheath. Thereafter, the bulkhead is secured to the sheath by a pair of bolts 48 which are carried in a pair of tab-like brackets 50 that are cut and inturned from the side-panel rear edge portions of the sheath, and received in a pair of relatively inverted, part tear-drop-shaped pockets 52 removed from the sides of the rabbet 46 in the bulkhead. The bolts 48 are equipped with nuts 54 and after passing through holes 56 in the shoulder portion 44 of the bulkhead, are flared over against the outside face of the same. In addition, the bulkhead 10 also has upper and lower grooves 58 in each side of the shoulder portion 48 thereof, and smaller rear end portions of the sheath are snipped and bent into the grooves, to secure the top and bottom panels of the sheath to the bulkhead.

The bulkhead 10 also has a strutted, centrally located embossment 60 on the outside face thereof, which in turn has a truncated cylindrical bore 62 therein, that extends through the body of the bulkhead and opens into the inside face thereof. The keeper device 20 is affixed to the bulkhead, by means of an end flanged, truncated cylindrical bushing 64 which is slidably inserted in the bore 62, and then flared over at the forward end thereof to remain on the bulkhead. The bushing has a plurality of ring-like members 66, etc. thereon, which are assembled between the tip of the embossment 60 and the rounded outturned flange 68 thereof. The first of these members 66, etc. in the front to rear direction is a hub-like washer 66 whose rear end face is countersunk to accommodate a U-shaped spring clip 70 which is inverted and engaged on the bushing 64 by forcing it down over the rounded flanks 64' of the same, until the separated legs 70' thereof engage the undersides of the flanks. The last of the members 66, etc. is a flat, square-shaped washer 72 whose opening, however, corresponds to the cross section of the bushing 64 and slidably engages about the same. The latter washer 72 has an ear 74 upstanding on the upper edge thereof, and interposed between the two washers 66 and 74, is a flat, rectangularly shaped and apertured catch plate 76 which has rearwardly reentrantly upturned fingers 78 depending from the bottom edge thereof, and a slightly bent, rearwardly projecting thumb 80 on the top edge thereof, in which there is a slot 82 that engages about the ear 74 so that the plate 76 is relatively slidable thereon. The slot 82 has a lip 84 depending from the rearward edge thereof, and the lip is spaced from the plate at approximately the same distance as are the hooks 78' of the fingers therefrom. As indicated, the aperture 76' of the plate 76 is also rectangular, and depending from the upper edge of the same is a right angular, forwardly oriented lug 86 which is inserted in the countersink 66' of the hub-like washer 66 and interposed between the bight 70'' of the clip 70 and the upper flat 64'' of the bushing. Otherwise, the aperture 76' of the plate slidably engages with the rounded flanks 64' of the bushing, but is spaced from the lower flat 64'' of the same, so that when the plate 76 is subjected to an upward force, there is sufficient clearance for it to undergo reciprocation in relation to the bushing, although the force must overcome the bias generated by the clip 70 as the legs 70' of the clip are drawn upwardly about the crests of the flanks 64' of the bushing. The bights 78'' of the fingers 78 are also spaced sufficient distance from the bottom edge of the square-shaped washer 72, to enable the plate 76 to undergo the prescribed reciprocation.

The switch unit 18 is a conventional snap-on unit, but in this instance, the diameter of the flange 68 on the bushing in the retainer device 20 more closely approximates that of the opening 89 in the double-edged bulkhead 90 at the forward end of the unit, and the flange 68 is adapted to project within the opening 89 when the unit is engaged on the device; so that the rounded edge of the flange serves as an abutment or bearing surface on which the upper section 90' of the bulkhead can stop and swivel in forcing its way between the flange 68 and the lip 84 of the thumb 80, with the effect that the catch plate 76 is raised by the bulkhead until the section 90' has lodged in front of the lip, that is, between the lip and the square-shaped washer 74. However, the engagement process is otherwise carried out as in the past, in that first, the lug constituted by the lower edge of the bulkhead 90 is inserted behind the hooks 78' of the fingers, and then the lug constituted by the upper edge of the bulkhead 90 is forced against the curved underside of the lip 84, there being simply the additional step at this point, of also abutting the upper rim of the opening 89 against the flange, to enable the bulkhead to force its way into the device 20, against the bias of the spring clip 70. In practice, the rim of the opening 89 readily seeks the rounded edge of the flange 68 to accomplish this result.

When disengaging the unit 18, it is necessary, of course, to apply a coplanar outside force to the plate 76, such as to the undersides of the fingers 78. Otherwise, the unit cannot be pivoted away from the device, as in FIG. 4. Similarly, however, the unit also cannot be disengaged by an undesired force, acting longitudinally of the assembly, since such a force must be accompanied by a transverse force operating to displace the catch plate 76, and the coincidence of such forces is highly unlikely.

The collar 2 of the servomechanism 4 is also formed by a molded plastic block which is front edge rabbetted and multi-apertured to accommodate the lamps 16. When the collar is inserted, in the cartridge, the rear end buttons 92 of the lamps make contract with the posts 34, and in addition, the shells 94 of the lamps are grounded through an additional post 34' that contacts a crosstie 96 in a multi-socketed metal sleeve member 98 which is bushed into the holes 100 of the collar to contact the shells. The crosstie 96 bridges a vertical rib 102 on the rear end face of the collar, which is enlarged at the center and has a bore 104 therein that extends through the collar from the front end face thereof, and opens into the rear end face of the block through the enlargement 106 of the rib 102. The bore 104 accommodates the plunger 8 of the servomechanism, and has a truncated cylindrical cross section corresponding to that of the front end portion 108 of the plunger. The rear end portion 110 of the plunger steps down, however, to a full cylindrical cross section, and this in turn is capped by a flange 112 on the rear end thereof.

Between the flange 112 and the rounded steps 114 of the plunger, is a pair of relatively small diameter and large diameter coiled springs 116 and 118, respectively. The springs are caged between three slides 120–124, each of which has a rabbetted or stepped configuration to form a seat or seats for the ends of the springs. Two of the slides 120 and 122 are disposed relatively forwardly of the rear end or shank portion 110 of the plunger, whereas the third slide 124 is abutted against the flange 112. Moreover, the more forward slides 120 and 122 are sized to telescope with one another, and of them, the relatively larger slide 120 is sized to slidably engage about the truncated cylindrical forward end portion 108 of the plunger into abutment with the collar, whereas the smaller slide 122 is sized to slidably engage about the shank portion 110 of the plunger, into abutment with the rounded steps 114 between the two portions.

The cap 6 is essentially a rectangularly shaped porthole frame 128 having parallel side sections 130 interconnected by spaced parallel upper and lower sections 132 which have channel means 134 formed thereon to accommodate a pair of lenses 136 which are laterally inserted across the front end of the frame. The upper and lower sections 132 also have rearwardly directed ears 138 midway thereon, and the plunger 8 is pinned to a strut 140 which is rigidly fixed upright between these ears 138 at the rear of the cap. The strut 140 thus interconnects the cap and the plunger, and in addition, serves as a stop for the collar 2 when it is released to the forward position thereof under the bias of the spring 118.

The lock mechanism 32 comprises a pair of oppositely laterally oriented lock pins 142 which are mounted in socketing cups 144 in the body of the collar 2, and equipped with socketed detent balls 146 at the flanged inside ends thereof, as well as coiled springs 148 thereabout, which are caged between the flange 150 and the bottoms of the cups 144. The balls 146 ride on the curved upper and lower sides of the forward end portion 108 of the plunger, and when so situated, operate to press the pins 142 outwardly of the collar, and to a distance adequate for the pins to engage in the dimples of the holes 30 in the sheath. However, when the balls 146 slip down the steps 114 of the plunger, and come into registry with the shank portion 110 of the plunger, the pins 142 are retracted by the springs 148 to a condition substantially flush with the upper and lower sides of the collar. Accordingly, when the servomechanism is inserted in the cartridge, to the extent that the collar has abutted and loaded the posts 34 in the manner of FIG. 2, then the plunger undergoes reciprocation with respect to the collar, and elevates the balls to the locked condition of the pins, the holes 30 being located to correspond with the abutted position of the collar at this time. Thereafter, moreover, when a shock force hits the back of the cartridge, and/or the switch unit, the force of the same must work against both pairs of springs 116 and 118 about the shank portion 110 of the plunger; whereas a force applied to the cap 6 for purposes of operating the servomechanism 2, works against only the inner spring 116, since only this abuts the plunger, as the springs 116 and 118, and the slide 124, are retained by the inturned flange 151 of the bushing 64, during the stroke of the plunger.

As in prior devices, the stroke actuates the switch unit through an intermediate toggle mechanism 152 which is disposed in the unit itself, and in turn actuates or releases the springloaded buttons 154 of the switch modules 156, depending on the nature of the unit.

What is claimed is:

1. A keeper device for a latch member having a pair of spaced oppositely disposed lugs in a terminal face thereof, and a stop recessed relatively inwardly of the member from said face in the space between the lugs, comprising core means that define a relatively stationary abutment on a terminal face of the device, which projects relatively outwardly of the device from the face, and peripheral means thereadjacent which are reciprocable on a parallel to the plane of the face, but yieldably biased into a normally stopped position spaced about the abutment, the peripheral means defining a pair of recesses which are spaced apart from one another across the abutment, and open relatively toward one another in the directions of reciprocation, and which are spaced apart from the abutment so that the lugs of the latch member interengage with the recesses in the normally stopped position of the peripheral means, when one lug of the member is inserted in one recess of the device, and the member is rotated in the sense that the stop is slidably engaged with the abutment, and the other lug of the member is slidably engaged with the peripheral means, at a point adjacent the other recess, so as to reciprocate the peripheral means in the direction opposed to the bias thereon.

2. The keeper device according to claim 1 wherein the peripheral means include an apertured catch plate which has opposing recesses in flanges on opposite ends thereof, and which is slidably guided about a core member having a pair of oppositely disposed part cylindrical surfaces thereon, and a U-shaped spring clip whose legs are engaged about the surfaces, and which is connected to the catch plate, so that the catch plate displaces the clip in relation to the core member, in the sense of causing the legs of the clip to separate against the bias thereof, when the latch member is interengaged with the recesses of the catch plate in the manner described.

3. In combination, an open-ended cartridge, a plunger style servomechanism housed in the cartridge, and a keeper device on the cartridge, having an aperture therein through which the servomechanism is reciprocated to actuate an operating unit disposed on a latch member which is engageable with the device and has a pair of spaced oppositely disposed lugs in a terminal face thereof, and a stop recessed relatively inwardly of the member from said face in the space between the lugs, said device comprising core means that define a relatively stationary abutment on a terminal face of the device, which projects relatively outwardly of the device from the face, and a peripheral means thereadjacent which are reciprocable on a parallel to the plane of the face, but yieldably biased into a normally stopped position spaced about the abutment, the peripheral means defining a pair of recesses which are spaced apart from one another across the abutment, and open relatively toward one another in the directions of reciprocation, and which are spaced apart from the abutment so that the lugs of the latch member interengage with the recesses in the normally stopped position of the peripheral means, when one lug of the member is inserted in one recess of the device, and the member is rotated in the sense that the stop is slidably engaged with the abutment, and the other lug of the member is slidably engaged with the peripheral means, at a point adjacent the other recess, so as to reciprocate the peripheral means in the direction opposed to the bias thereon.

4. The combination according to claim 3 wherein the servomechanism is releasable from the cartridge by virtue of the plunger being reciprocably guided in a collar which is carried thereon, and which is equipped with a lock mechanism that is responsive to relative reciprocation of the plunger, to lock and unlock the collar with respect to the cartridge, when the collar assumes a predetermined position in the cartridge.

5. In a cartridge mounted servomechanism for an operating unit, a reciprocably guided plunger which is operable to actuate the operating unit in one reciprocable direction thereof, and releasable from the cartridge in the other reciprocable direction thereof, and which has relatively larger diameter and smaller diameter portions thereon, joined by a step therebetween, and pairs of collars slidably engaged thereon, one pair of which is slidably engaged on the relatively larger and smaller diameter portions, respectively, and the other pair of which is slidably engaged on the smaller diameter portion, means including the step, which are operable to limit the travel of the collars in the aforesaid reciprocable directions of the plunger, and a pair of yieldable biasing elements which are interposed between the respective pairs of collars and telescopically compressible and extendable, one within the other, to vary the bias on the plunger when it is reciprocated in the respective reciprocable directions thereof.

6. The servomechanism according to claim 5 wherein the collar on the relatively larger diameter portion of the plunger has a locking element thereon which is projectable and retractable in a transverse plane of the collar, and which is engageable with a locking detent on the cartridge in the projected condition thereof, there being means cooperable therewith to project and retract the locking element in response to reciprocation of the step between the opposite sides of the plane of the collar.

7. The servomechanism according to claim 5 wherein the cartridge has a keeper device thereon, for engagement with a latch member having the operating unit disposed thereon, and the keeper device has an aperture therein through which the plunger is reciprocable to actuate the operating unit when the latch member is engaged with the keeper device.

8. The servomechanism according to claim 7 wherein the plunger is inserted in a bushing having an inturned flange on one end portion thereof, forming a stop for the collars thereadjacent, and the keeper device is mounted on the flanged end portion of the bushing.

9. The servomechanism according to claim 8 wherein the latch member has a pair of spaced oppositely disposed lugs in a terminal face thereof, and a stop recessed relatively inwardly of the member from said face in the space between the lugs, and the keeper device comprises means on the bushing that define a relatively stationary abutment on a terminal face of the device, which projects relatively outwardly of the device from the face, and peripheral means thereadjacent which are reciprocable on a parallel to the plane of the face, but yieldably biased into a normally stopped position spaced about the abutment, the peripheral means defining a pair of recesses which are spaced apart from one another across the abutment, and open relatively toward one another from the abutment so that the lugs of the latch member interengage with the recesses in the normally stopped position of the peripheral means, when one lug of the member is inserted in one recess of the device, and the member is rotated in the sense that the stop is slidably engaged with the abutment, and the other lug of the member is slidably engaged with the peripheral means, at a point adjacent the other recess, so as to reciprocate the peripheral means in the direction opposed to the bias thereon.

10. The servomechanism according to claim 9 wherein the bushing has a washer-like outturned flange thereon, and the peripheral means include an apertured catch plate which has opposing recesses in flanges on opposite ends thereof, and which is slidably guided about the bushing, said bushing having a pair of oppositely disposed part cylindrical surfaces thereon, and a U-shaped spring clip whose legs are engaged about the surfaces, and which is connected to the catch plate, so that the catch plate displaces the clip in relation to the bushing, in the sense of causing the legs of the clip to separate against the bias thereof, when the latch member is interengaged with the recesses of the catch plate in the manner described.

* * * * *